Aug. 13, 1968

J. H. FORKNER 3,396,656

SUSPENSION SYSTEM FOR FOOD DEHYDRATION CENTRIFUGE

Filed Sept. 20, 1966

INVENTOR.
JOHN H. FORKNER

BY

ATTORNEY

INVENTOR.
JOHN H. FORKNER
BY
James V. Harmon
ATTORNEY

United States Patent Office 3,396,656
Patented Aug. 13, 1968

3,396,656
SUSPENSION SYSTEM FOR FOOD
DEHYDRATION CENTRIFUGE
John H. Forkner, Fresno, Calif., assignor to The Pillsbury Company, Minneapolis, Minn., a corporation of Delaware
Continuation-in-part of application Ser. No. 157,538 Dec. 6, 1961. This application Sept. 20, 1966, Ser. No. 580,678
14 Claims. (Cl. 99—407)

ABSTRACT OF THE DISCLOSURE

A suspension system for a food dehydration tank containing a centrifuge at its lower end including cushions between a suspending framework and support members secured to the upper end of the tank for allowing lateral deflection of the lower end of the tank when the centrifuge is operated. The cushions consist typically of rubber blocks.

---

This application is a continuation-in-part of application Ser. No. 157,538, filed Dec. 6, 1961, now Patent No. 1,261,694.

This invention relates generally to apparatus for the dehydration of various food products, including such products as fruits, berries, nuts, cereals, vegetables, poultry, meat, fish, moist formulated mixtures of the same, and products fabricated with moist dough. More specifically, the invention pertains to dehydration apparatus incorporating a centrifuge.

In my copending application Ser. No. 157,538, filed Dec. 6, 1961, now U.S. Patent No. 3,261,694 (corresponding to French Patent No. 1,314,092) there is disclosed a method and apparatus for the dehydration of various moist food products. Briefly, the method involves subjecting a body of hot oil at a temperature level of from 240–600° F. to a partial vacuum of the order of 22–29 inches mercury column. Particles of the moist food product, preferably in frozen condition, are enveloped in the hot oil whereby rapid heat transfer occurs between the oil and the food product with rapid evolution of water vapor to create a vapor-oil mixture which envelops the food product and causes a rapid drop in temperature of the oil to a level within the range of from 130–230° F. Evaporation under partial vacuum preferably is continued at the lower temperature level until the moisture content of the food product has been reduced to the desired level. The oil is then separated from the dehydrated product and thereafter the partial vacuum is released. Preferably before the vacuum is released the particles are deposited within a centrifuge basket and subjected to centrifugal forces for removal of a substantial part of the residual oil.

The apparatus disclosed in application Ser. No. 157,538 for carrying out the foregoing method consists of a tank having its upper portion connected to evacuating means and provided with means for feeding a food product in a frozen condition into the interior of the tank. The lower removable section of the tank includes a centrifuge basket. The construction of this type of apparatus poses certain problems, particularly because of the vibrational forces applied by the centrifuge. In addition the combination of a dehydrating tank and centrifuge must be constructed in such a fashion as to permit ready removal of the final dehydrated product at the end of a dehydrating cycle.

In general, it is an object of the present invention to provide novel apparatus for carrying out the method of my aforesaid copending application, or for carrying out other methods where the food product is dehydrated by introducing it into hot oil under partial vacuum.

A further object of the invention is to provide apparatus of the above character which will withstand the vibrational forces incident to operation of the centrifuge while at the same time permitting ready removal of the centrifuge to remove the dehydrated product.

Additional objects and features of the invention will appear from the following description in which the preferred embodiments are set forth in detail in conjunction with the accompanying drawings wherein.

Figure 1:
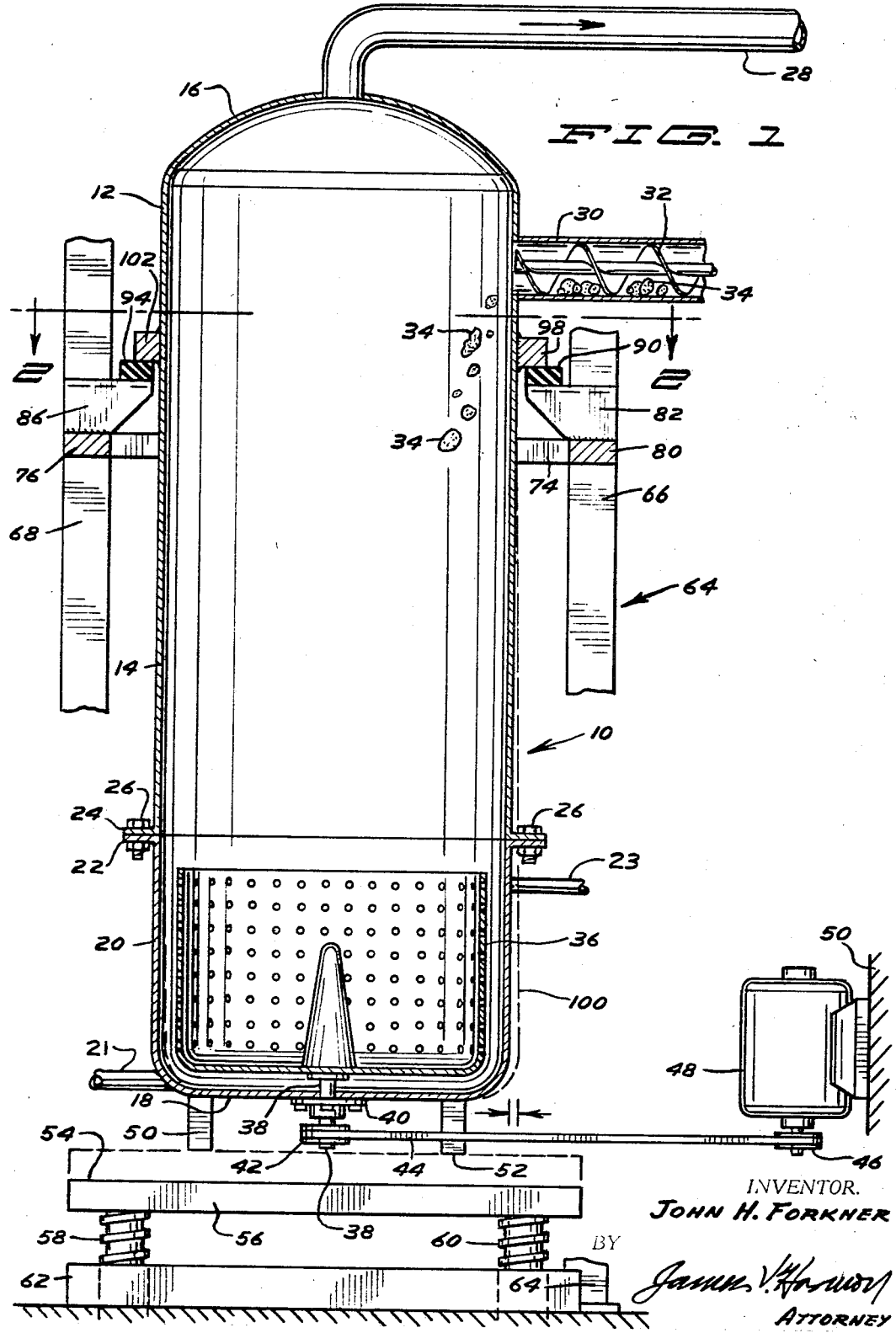
FIGURE 1 is a vertical transverse sectional view of a food dehydration centrifuge embodying the invention.
Figure 2:
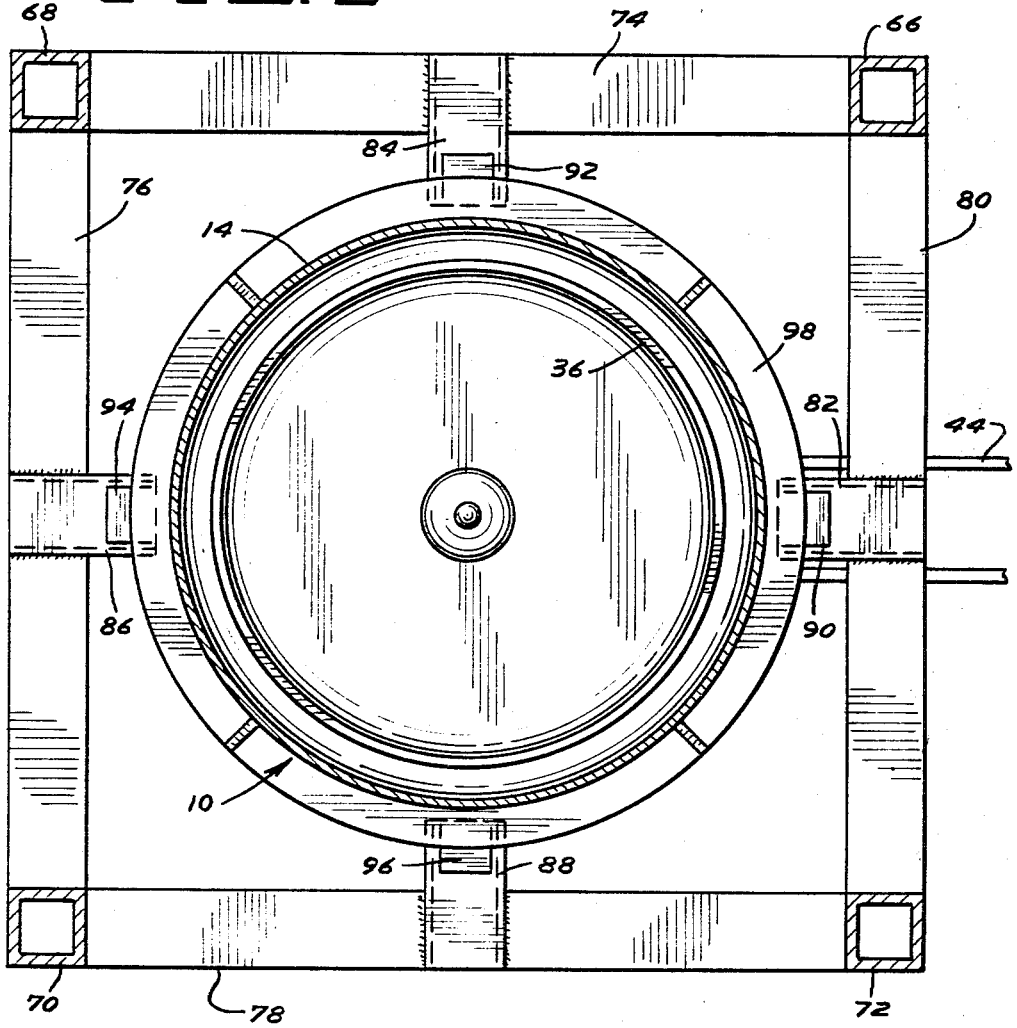
FIGURE 2 is a transverse sectional view taken on line 2—2 of FIGURE 1.

Referring now to the drawings, there is shown a combined food dehydration apparatus centrifuge indicated at 10 comprising a tank 12 having a cylindrical side wall 14, a domed top wall 16 and a bottom wall 18 which comprises the end of a cup-shaped housing 20 defining the bottom of the tank 12. An outwardly extending circumferential flange 22 is provided at the top of the housing 20 in a position to mate with a similar flange and gaskets 24 at the bottom of the cylindrical wall 14. Connected to the bottom of tank 20 is an exhaust duct 21 and an oil supply duct 23. The flanges are secured together as by means of circumferentially spaced bolts 26, only two of which are shown. At the top of the dehydration apparatus is an exhaust duct 28 permitting the application of a vacuum from a vacuum source (not shown) to the interior of the apparatus 10. Also connected to the top of the tank 12 is a duct 30 within which is an auger 32 used for conveying food products 34 into the dehydration tank 12. Means for maintaining a vacuum utilizing this auger-type deposition from a vacuum batch feed tank are not shown.

A centrifuge basket 36 situated in the lower area of tank 12 is mounted for rotation upon a vertical shaft 38 journalled within a near vacuum and liquid-tight bearing 40 affixed to the bottom wall 18 of the housing 20. The bearing 40 is of a type that will permit limited deflection of the centrifuge basket 36 and shaft 38 relative to the vessel. Upon the shaft 38 is mounted a sheave 42 over which is entrained an endless belt 44. The other end of the belt 44 is entrained over a sheave 46 affixed to a motor 48. The motor 48 is mounted upon a stationary support 50. During operation, relative movement between the lower end of the vessel and the motor 48 deflects shaft 38 slightly relative to the vessel. Similar results may be achieved by other methods of transmitting power such as a universal joint wherein deflection is provided for. Alternatively, the motor 48 is mounted upon the housing 20 and if this provision is made the motor 48 will swing back and forth with the housing 20.

Rigidly affixed to the bottom of the housing 20 and extending downwardly therefrom are a pair of horizontally spaced lifting brackets 50 and 52 adapted to be engaged when the housing 20 is to be removed by the upper surface 54 of a jack 56. The jack 56 includes suitable raising and lowering mechanism such as screws 58 and 60 each threaded within a base 62.

The jack assembly 56 exemplifies one means of raising and lowering the basket for removal of product and loading. When the basket is attached to tank 12 as described and is in operation, i.e., rotating, the jack may be disconnected from the basket allowing the basket to deflect as occasioned by rotation. FIGURE 1 shows the jack having elevated the basket into position and before retarding it to provide deflection action of the basket when rotation commences.

The support assembly for the tank 12 indicated generally at 64 will now be described. It consists of a tower including several vertically disposed and generally rectangularly arranged upright members such as columns 66, 68, 70 and 72. These columns are secured together in this illustration by means of horizontally disposed beams 74, 76, 78 and 80.

Upon each of the beams is mounted an upwardly and centrally extending bracket or support element. These elements are designated 82, 85, 86 and 88. On the upward surface of the support elements are mounted cushioning means such as resilient blocks designated 90, 92, 94 and 96 respectively. By "cushioning means" is meant any means of attachment providing deflection of the tank while the centrifuge is in operation.

Suitably rigidly secured as by welding to the outward surface of the tank 12 near its upward end and at least above a point above the center thereof is a stop member comprising a ring 98. The ring 98 rests upon the blocks 90 through 96, so that during operation the entire weight of the tank 12 and centrifuge housing 20 is supported by the rubber blocks 90–96 and the tower 64. These blocks may be formed from fiber, springs or any compressible substance applicable.

Briefly, in accordance with the present invention, moist food material in particles of suitable size and at a low temperature level, is subjected to treatment under partial vacuum to complete a dehydration cycle, the treatment including dispersion of the particles in a mixed phase material or foam consisting of water vapor and hot oil. To start the cycle the material can be introduced under applied vacuum into a quantity of hot oil which has been supplied from a source of heated oil through the duct 23. The temperature of the oil at the time of the initial contact is relatively high compared to the vaporization point of water at the applied partial vacuum, as for example from 240° F. to 600° F., the range of from 325° F. to 440° F. being preferred. In a typical instance the material is frozen and is at a temperature level below 32° F. Because of the great temperature differential between the material and the hot oil, a rapid heat exchange takes place whereby the outer surface layer of the product is flash heated to the vaporization point of the hydrous juices present. Immediately the initial phase of the dehydration cycle proceeds at a rapid rate with almost explosive violence. Rapidly evolving vapor forms a mixture of vapor and oil, or what can be termed a foam of greatly increased volume (e.g., without defoaming agents more than three times the normal volume of oil and product), with great violent agitation or churning action. The oil temperature drops immediately and rapidly and the evolving vapor creates a high rate of vapor flow to the evacuating means employed. The surfaces of the material and the outer layers through which dehydration progresses are protected by the rapidly evolving vapor against burning by direct contact with the hot oil. During this initial phase the material is subject to certain conditions which make for novel properties in the final product, as will be presently explained.

After the first initial phase of rapid evaporation the rate of vapor flow diminishes, the foam subsides, and the level of the oil body returns to near its initial level. Thereafter (assuming that a low moisture content is desired) dehydration is continued at a lower temperature level to complete the cycle. The major part (e.g., 75 to 95%) of the moisture present in the material is removed in the short time (e.g., ½ to 4 minutes depending largely on particle size, moisture content and initial temperature of the particles, ratio of particle weight to weight of oil and oil temperature) of the first rapid evaporation phase, and the remaining moisture (except for residual) is removed at the lower temperature level. In general, the overall time period of treatment in the hot oil under applied partial vacuum is relatively short and may, in typical instances, be of the order from 7 to 40 minutes.

When the moisture content of the material has been reduced to the value desired, any one of a number of procedures can be followed depending on the character of the final product required. One procedure is to break the vacuum after separation of free oil from the product by draining after which some further oil may be removed by centrifuging. However, for most of the applicable source materials I prefer to effect a general separation between the free oil and dehydrated material and then to subject the material to centrifuging all under partial vacuum after which the vacuum is broken. Such procedure produces certain novel and desirable properties in the final product.

The operation of the apparatus illustrated in the figures is as follows: The charge of the chilled material to be dehydrated is introduced into the tank 12 with a quantity of the hot oil in housing 20. Pipe 28 is connected to condensing and evacuating means as previously described. Before the cycle is commenced, the frozen product fed through duct 30 by auger 32 is subjected to a partial vacuum and thereby deaerated. Because the material is delivered at a substantially even rate into the upper part of tank 12, it continually drops downwardly into the lower portion of the tank to contact the hot oil. Preferably, the introduction of the frozen material occurs over an appreciable interval of time such as from 7 to 30 seconds or longer in the case of larger commercial batches. Immediately upon first contact of the frozen material with the body of hot oil, rapid heat transfer takes place with rapid evaporation. The rate of vapor evolution is so rapid that it creates with the oil a foam like medium comprising an expanded mixture of vapor and liquid oil which rises in the tank as a column extending above the surface of the oil body. At the time or shortly after the introduction of the charge has been completed, substantially no oil remains as a liquid body above the flanges 22 and 24. The tank should be of sufficient height whereby the mixed vapor-oil medium does not appreciably extend into the pipe 28. In a typical instance, the height of this column may be from 6 to 10 times the original height of the oil body. During continual introduction of the charge of frozen material, the frozen particles drop down through the mixed phase vapor-oil column. This continuous application of refrigeration serves to keep the foam column and vapor flow rate under control without developing a column of undue height or a vapor flow rate which cannot be handled by the condenser. The water vapor-oil mixture is cooled by contact with the incoming frozen material and the vapor passing to the condenser is caused to be at a lower temperature level. Also introducing the material over a predetermined charging period provides a reduced product to oil ratio at the beginning of the cycle.

The feature just described makes possible economical ratios between the weight of charge and the weight of the coil employed because it maintains the development of a foam column and evolution of vapor under control during the first part of the cycle, at which time evolution of moisture, creation of foam and vapor flow tend to be particularly violent.

As previously described, the initial phase is accompanied by a rapid drop in oil temperature. At this time a part of the oil can be removed through duct 21 and clarified hot oil substituted.

The basket 36 is now rotated whereby some remaining free oil is removed through duct 21. It should be noted that as the oil line receded the particles contained therein are relatively uniformly deposited in the centrifuge basket 36. This utilization of the oil removal to distribute the product relatively uniformly provides for minimum deflection when the basket is subsequently rotated. As this takes place, the blocks 90 to 96 are deformed and the bottom of the tank 12 will oscillate to an extent dependent upon the degree of imbalance of the basket 36 load weight and speed and time of gaining speed. At or near the end of this centrifuging operation the partial vacuum applied to tank 12 can be increased. For example, where the partial vacuum has been of the order of 27 to 28½ inches mercury column, the vacuum is increased in tank 12 to a value of the order of 29 to 29¾. This serves to remove some additional moisture from the product, and this is accompanied by evaporative cooling of the product. Assuming use of a normally solid oil, evaporative cooling preferably is employed to reduce the temperature of the product to a value below the melting point of the oil, thus causing remaining oil to congeal before the vacuum is broken. Application of a high vacuum at the end of the cycle has a further desirable effect in that it tends to expand the cell or tissue structure immediately before cooling has proceeded to the extent of handling or setting the tissue and congealing the oil, thereby retaining an optimum volume.

Present invention was found to be very effective in isolating vibration of the tank 12 from the tower 64. The mass of the tank also contributes to the elimination of vibration and the resiliency of the blocks 90–96 provides a simple but effective yieldable support for the tank while at the same time biasing the tank to the resting solid line position of FIGURE 1.

The discs 90–96 can vary considerably in construction but I have found that with a tank weighing approximately 5000 pounds and adapted to hold a charge of food and oil weighing about 3000 pounds that blocks of hard rubber about 4 inches square as seen from above and about 6 inches thick proved highly satisfactory. I found that when such an apparatus was operated (the tank in this case being about 38 feet high) the lower end of the tank was deflected about ⅜ inch to the dotted line position 100. While four brackets and blocks are shown by way of example, it is understood that any number of blocks can be employed. Indeed it is possible for a continuous block to extend around the entire circumference of the tank if desired. It should be noted that the supporting point of the tank 12, here illustrated by the blocks described, is at a point above the vertical centerline of the tank. This leaves the major extension of the tank where support is in the upper ⅓ area as shown to swing clearly below the support point.

A variety of modifications can be made in the apparatus according ot the invention. For example, where the tank 12 is relatively great in length, as for example over about 30 feet in length and is formed from a relatively deflectable material, the rubber blocks 90 through 96 may be eliminated. If this modification is made, the resiliency of the tank 12 itself will function to permit the required deflection to dotted line 100.

Figure 3:
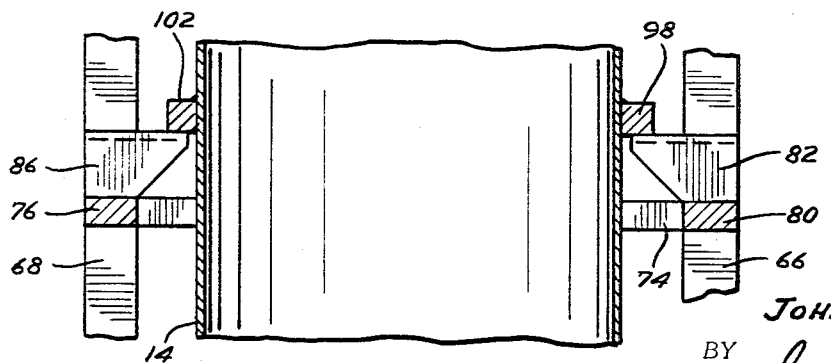
FIGURE 3 is a partial vertical sectional view of a modified suspension according to the invention.

Refer now to FIGURE 3 which shows a modified form of the invention in which the rubber blocks are not used. In this form, there is no relative movement between the brackets and the stops 98–104. Instead, deflection of the lower end of the tank within its elastic limit provides vibration damping.

Still other variations of the invention will be apparent to those skilled in the art. For example, the supporting tower can be any form of elevated structure capable of supporting the prescribed dehydration vessel from its upward end. For example, the tower may comprise a series of horizontally disposed beams mounted upon a suitable rigid structure. Alternatively, the tower can comprise spaced columns or it may consist of a portion of a building or of a cantilevered beam.

The suspension members used for supporting the tank from the tower have been shown by way of example as resilient plastic blocks. A number of variations will be apparent. For example, the blocks can be formed from an elastomeric material other than rubber or from a compressible material or device such as a metal spring composed of one or more parts. Moreover, the suspension members can comprise hangers such as short helical springs connected at their upward end to the tower and at their lower end to the tank. They can also consist of a jointed or toggle connector of any of a variety of types known to the art with at least three being distributed at equally spaced intervals around the circumference of the tank. Other materials and devices such as pneumatic suspension means can be substituted for the resilient blocks if deemed desirable provided they exhibit the requisite strength and flexibility. While the screw jack described has been disclosed to illustrate one form of means for supporting the lower portion of the vessel, other means will be apparent to those skilled in the art such as pneumatic lift trucks or other raising and lowering appliances which can be either separate or form a part of the vessel 10.

It should be apparent that many variations from and modifications of the embodiments described above may be made without departing from the scope of the present invention. Accordingly, the invention should be limited only as indicated in the following claims:

I claim:
1. In food dehydration apparatus, a dehydrating tank adapted to contain hot oil, means for connecting the upper part of the tank to evacuating means, means also communicating with the upper portion of the tank for introducing material to be dehydrated, centrifuge means carried by the lower part of the tank, said centrifuge means including a centrifuge basket and an enclosure surrounding the basket which forms a lower extension of the tank, and cushioning means for suspending both the tank and the centrifuge means, said cushioning means engaging the upper portion of the tank and allowing deflection of the lower portion of the tank.

2. Dehydrating apparatus as in claim 1 in which said enclosure is detachably secured to the main portion of the tank.

3. The food dehydration apparatus of claim 1 wherein a motor spaced from the tank is connected to the centrifuge basket for imparting rotation thereto.

4. The food dehydration apparatus of claim 1 wherein the tank comprises an elongated hydration tank supported from said cushion at a point on the tank between the center thereof and the upper end thereof and the centrifuge basket is mounted for rotation upon a vertical axis within the vessel at the lower end thereof.

5. The food dehydration apparatus of claim 1 wherein the cushioning means comprise a plurality of circumferentially spaced resilient blocks mounted between the vessel and the support assembly, said blocks being deformed by lateral deflection of the lower end of the tank and said tank comprises an elongated dehydration vessel supported from a point on the vessel between the center and the upper end thereof whereby the lower end of the tank will be capable of limited lateral deflection to prevent undesirable vibration from being imparted to the tower as the result of eccentric loading of said centrifuge basket.

6. A suspension system for a food dehydration centrifuge comprising in combination, a tower, a vertically disposed tank supported from the tower, a centrifuge basket at the bottom of the tank, means for imparting rotation to the centrifuge basket, and a means for suspending the tank from the tower comprising a means connecting the tank and the tower at a point on the tower above the center thereof, said tank comprising an elongated metallic cylinder having sufficient resiliency to be deflected within the elastic limit thereof for allowing a limited lateral movement between the tower and the tank at the lower end of the tank.

7. The suspension system of claim 6 including duct means connected to the tank for removing the air therefrom.

8. The suspension system for food dehydration centrifuge of claim 6 including circumferentially spaced bracket members on the tower, a resilient elastomeric block positioned on the upward surface of each of the brackets.

9. The apparatus of claim 6 wherein a circular stop is provided on the tank and spaced resilient blocks are mounted between the stop and the tower.

10. The apparatus according to claim 6 wherein vacuum seals are provided on the vessel for preventing undesired entrance of air therein and a means connected to the vessel for withdrawing the air therefrom.

11. The apparatus according to claim 6 wherein the vessel comprises at least two separable parts with dimensions of the lower portion conforming generally to those of a centrifuge basket housed therein and the upper portion of the vessel being provided with a means for conveying food particles therein.

12. The apparatus according to claim 6 wherein a power transmission is provided spaced from the vessel and a flexible coupling means is operatively connected between the power transmission and the vessel for imparting rotation to the centrifuge basket.

13. The apparatus of claim 6 wherein a pneumatic suspension means is operatively connected between the tower and the vessel.

14. The apparatus of claim 6 wherein an inlet means is connected to the vessel for introducing food particles into the upper end of the vessel.

References Cited
UNITED STATES PATENTS

| | | | |
|---|---|---|---|
| 2,473,184 | 6/1949 | Webb | 99—204 |
| 2,620,070 | 12/1952 | Dodge | 68—23 |
| 2,644,326 | 7/1953 | Worst | 68—23 |
| 2,930,215 | 3/1960 | Smith | 68—23 |
| 2,987,190 | 6/1961 | Bochan | 68—23 |
| 2,994,613 | 8/1961 | Strehlow | 99—207 |
| 3,021,956 | 2/1962 | Bochan | 68—23 X |

R. W. JENKINS, *Primary Examiner.*